(12) United States Patent
Afifi et al.

(10) Patent No.: US 12,439,173 B2
(45) Date of Patent: Oct. 7, 2025

(54) SYSTEM AND METHOD OF WHITE BALANCING A DIGITAL IMAGE WITH MULTIPLE LIGHT SOURCES

(71) Applicants: Mahmoud Afifi, North York (CA); Michael Brown, Toronto (CA); Marcus Brubaker, Toronto (CA)

(72) Inventors: Mahmoud Afifi, North York (CA); Michael Brown, Toronto (CA); Marcus Brubaker, Toronto (CA)

( * ) Notice: Subject to any disclaimer, the term of this patent is extended or adjusted under 35 U.S.C. 154(b) by 343 days.

(21) Appl. No.: 17/930,213

(22) Filed: Sep. 7, 2022

(65) Prior Publication Data

US 2023/0098058 A1   Mar. 30, 2023

Related U.S. Application Data

(60) Provisional application No. 63/242,649, filed on Sep. 10, 2021.

(51) Int. Cl.
*H04N 23/88*     (2023.01)
*G06T 3/40*     (2006.01)
(Continued)

(52) U.S. Cl.
CPC ............... *H04N 23/88* (2023.01); *G06T 3/40* (2013.01); *G06T 7/90* (2017.01); *G06V 10/82* (2022.01); *G06T 2207/10024* (2013.01)

(58) Field of Classification Search
CPC .......... G06T 3/4015; G06T 3/40; G06T 7/90; G06T 2207/10024; G06T 5/92; H04N 2209/046; H04N 23/88; G06V 10/82
See application file for complete search history.

(56) References Cited

U.S. PATENT DOCUMENTS 5,839,440 A   11/1998  Liou et al.
9,858,652 B2   1/2018  Finlayson et al.
(Continued)

FOREIGN PATENT DOCUMENTS

CN   109300120 A   2/2019
WO   2020206539 A1   10/2020

OTHER PUBLICATIONS

H. Luo and X. Wan, "Estimating Polynomial Coefficients to Correct Improperly White-Balanced sRGB Images," in IEEE Signal Processing Letters, vol. 28, pp. 1709-1713, 2021, doi: 10.1109/LSP.2021.3102527. (Year: 2021).*

(Continued)

*Primary Examiner* — Stephen R Koziol
*Assistant Examiner* — Dylan J Sherrillo
(74) *Attorney, Agent, or Firm* — Bhole IP Law; Anil Bhole; Marc Lampert

(57) ABSTRACT

A system and method for white balancing a digital image. The method including downsampling the digital image to generate a downsampled image; processing the downsampled image with a plurality of preset white balance settings to generate a plurality of white balanced downsampled images; processing the input image at a fixed white balanced setting to produce an initial image; inputting the white balanced downsampled images to a deep neural network to generate a weighting map, the weighting map including weights of the preset white balance settings at windows of the downsampled images; generating a white balanced output image by applying the weighting map to the initial image; and outputting the white balanced output image.

18 Claims, 13 Drawing Sheets

(51) Int. Cl.
G06T 7/90 (2017.01)
G06V 10/82 (2022.01)

(56) References Cited

U.S. PATENT DOCUMENTS

| | | | |
|---|---|---|---|
| 10,915,991 | B2 | 2/2021 | Paris et al. |
| 11,044,450 | B2 | 6/2021 | Afifi et al. |
| 2008/0111821 | A1 | 5/2008 | Arora |
| 2010/0054592 | A1 | 3/2010 | Nanu et al. |
| 2010/0194918 | A1 | 8/2010 | Zhang et al. |
| 2013/0307999 | A1 | 11/2013 | Motta |
| 2015/0015586 | A1 | 1/2015 | Messmer et al. |
| 2017/0024852 | A1 | 1/2017 | Öztireli et al. |
| 2017/0272619 | A1 | 9/2017 | Finlayson |
| 2018/0007337 | A1* | 1/2018 | Barron ............. G06T 5/90 |
| 2018/0114294 | A1 | 4/2018 | Yang et al. |
| 2019/0045163 | A1* | 2/2019 | Nikkanen ........ H04N 23/88 |
| 2020/0057900 | A1 | 2/2020 | Pribble et al. |
| 2022/0182537 | A1* | 6/2022 | Kim ................ H04N 23/80 |
| 2023/0098058 | A1 | 3/2023 | Afifi et al. |

OTHER PUBLICATIONS

Examination Report for European application No. 20788129.3, EPO, dated: Feb. 5, 2025.
Office Action for U.S. Appl. No. 17/602,468, USPTO, dated: Apr. 25, 2024.
Hsu, Eugene, et al., "Light Mixture Estimation for Spatially Varying White Balance", ACM Transactions on Graphics, 27(3), 1-7, (2008), https://doi.org/10.1145/1360612.1360669.
Hu, Yuanming, et al., "FC$^{\wedge}$4: Fully Convolutional Color Constancy with Confidence-Weighted Pooling", 2017 IEEE Conference on Computer Vision and Pattern Recognition (CVPR), Honolulu, HI, USA, 2017, pp. 330-339, doi: 10.1109/CVPR.2017.43.
Hussain, Md Akmol, et al., "Color Constancy Algorithm for Mixed-Illuminant Scene Images", IEEE Access, vol. 6, pp. 8964-8976, 2018, doi: 10.1109/Access.2018.2808502.
Joze, Hamid Reza Vaezi, et al., "Exemplar-Based Color Constancy and Multiple Illumination", IEEE Transactions on Pattern Analysis and Machine Intelligence, vol. 36, No. 5, pp. 860-873, May 2014, doi: 10.1109/TPAMI.2013.169.
Joze, Hamid Reza Vaezi, et al., "The role of bright pixels in illumination estimation", Color and Imaging Conference, Society for Imaging Science and Technology, vol. 2012, No. 1, pp. 41-46, (Jan. 2012).
Kim, Seon Joo, et al., "A New In-Camera Imaging Model for Color Computer Vision and its Application", IEEE Transactions on Pattern Analysis and Machine Intelligence, vol. 34, No. 12, pp. 2289-2302, Dec. 2012, doi: 10.1109/TPAMI.2012.58.
Kingma, Diederik P., et al., "Adam: A Method for Stochastic Optimization", 3rd International Conference for Learning Representations, San Diego, 2015, https://doi.org/10.48550/arXiv.1412.6980.
Lo, Yi-Chen, et al., "CLCC: Contrastive Learning for Color Constancy", 2021 IEEE/CVF Conference on Computer Vision and Pattern Recognition (CVPR), Nashville, TN, USA, 2021, pp. 8049-8059, doi: 10.1109/CVPR46437.2021.00796.
Lou, Zhongyu, et al., "Color Constancy by Deep Learning", Proceedings of the British Machine Vision Conference (BMVC), pp. 76.1-76.12. BMVA Press, Sep. 2015, https://dx.doi.org/10.5244/C.29.76.
Mitsunaga, Tomoo, et al., "Radiometric Self Calibration", Proceedings. 1999 IEEE Computer Society Conference on Computer Vision and Pattern Recognition (Cat. No PR00149), Fort Collins, CO, USA, 1999, pp. 374-380 vol. 1, doi: 10.1109/CVPR.1999.786966.
Murmann, Lukas, et al., "A Dataset of Multi-Illumination Images in the Wild", 2019 IEEE/CVF International Conference on Computer Vision (ICCV), Seoul, Korea (South), 2019, pp. 4079-4088, doi: 10.1109/ICCV.2019.00418.

Nam, Seonghyeon, et al., "Modelling the Scene Dependent Imaging in Cameras with a Deep Neural Network", 2017 IEEE International Conference on Computer Vision (ICCV), Venice, Italy, 2017, pp. 1726-1734, doi: 10.1109/ICCV.2017.190.
Nguyen, Rang M. H., et al., "RAW Image Reconstruction using a Self-Contained sRGB-JPEG Image with only 64 KB Overhead", 2016 IEEE Conference on Computer Vision and Pattern Recognition (CVPR), Las Vegas, NV, USA, 2016, pp. 1655-1663, doi: 10.1109/CVPR.2016.183.
Nguyen, Rang M, et al., "RAW Image Reconstruction Using a Self-contained sRGB-JPEG Image with Small Memory Overhead", International Journal of Computer Vision, 126(6), 637-650 (2018). https://doi.org/10.1007/s11263-017-1056-0.
Oh, Seoung Wug, et al., "Approaching the computational color constancy as a classification problem through deep learning,", Pattern Recognition, vol. 61, 2017, pp. 405-416, ISSN 0031-3203, https://doi.org/10.1016/j.patcog.2016.08.013.
Qian, Yanlin, et al., "On Finding Gray Pixels", 2019 IEEE/CVF Conference on Computer Vision and Pattern Recognition (CVPR), Long Beach, CA, USA, 2019, pp. 8054-8062, doi: 10.1109/CVPR.2019.00825.
Qian, Yanlin, et al., "Revisiting Gray Pixel for Statistical Illumination Estimation", Proceedings of the 14th International Joint Conference on Computer Vision, (2019), Imaging and Computer Graphics Theory and Applications—vol. 4: VISAPP, ISBN 978-989-758-354-4; ISSN 2184-4321, pp. 36-46. DOI: 10.5220/0007406900360046.
Rosenberg, Charles, et al., "Bayesian color constancy with non-gaussian models", Proceedings of the 16th International Conference on Neural Information Processing Systems (NIPS'03). MIT Press, Cambridge, MA, USA, pp. 1595-1602, (2003).
Sharma, Gaurav, et al., "The CIEDE2000 color-difference formula: Implementation notes, supplementary test data, and mathematical observations", Color Research and Application, 30: 21-30 (2005). https://doi.org/10.1002/col.20070.
Shi, Wu, et al., "Deep Specialized Network for Illuminant Estimation", Computer Vision—ECCV 2016. European Conference on Computer Vision 2016. Lecture Notes in Computer Science, vol. 9908. Springer, Cham. https://doi.org/10.1007/978-3-319-46493-0_23.
Van De Weijer, Joost, et al., "Edge-Based Color Constancy", IEEE Transactions on Image Processing, vol. 16, No. 9, pp. 2207-2214, Sep. 2007, doi: 10.1109/TIP.2007.901808.
Xu, Bolei, et al., "End-to-End Illuminant Estimation Based on Deep Metric Learning", 2020 IEEE/CVF Conference on Computer Vision and Pattern Recognition (CVPR), Seattle, WA, USA, 2020, pp. 3613-3622, doi: 10.1109/CVPR42600.2020.00367.
Yuan, Lu, et al., "High Quality Image Reconstruction from RAW and JPEG Image Pair", 2011 International Conference on Computer Vision, Barcelona, Spain, 2011, pp. 2158-2165, doi: 10.1109/ICCV.2011.6126492.
International Search Report for PCT application No. PCT/CA2020/050465, CIPO, search completed: May 4, 2020, mailed: Jun. 11, 2020.
Supplementary European Search Report for European application No. 20788129.3, EPO, search completed: Nov. 1, 2022, mailed: Nov. 10, 2022.
Written Opinion for PCT application No. PCT/CA2020/050465, CIPO, opinion completed: May 4, 2020, mailed: Jun. 11, 2020.
Afifi, Mahmoud, et al., "As-projective-as-possible bias correction for illumination estimation algorithms", (2018), Journal of the Optical Society of America A, 36(1), 71. https://doi.org/10.1364/josaa.36.000071.
Afifi, Mahmoud, et al., "Color temperature tuning: Allowing accurate post-capture white-balance editing", (2019), Color and Imaging Conference, 27(1), 1-6. https://doi.org/10.2352/issn.2169-2629.2019.27.2.
Afifi, Mahmoud, et al., "Cross-Camera Convolutional Color Constancy", 2021 IEEE/CVF International Conference on Computer Vision (ICCV), 2021, pp. 1961-1970, doi: 10.1109/ICCV48922.2021.00199.

(56) References Cited

OTHER PUBLICATIONS

Afifi, Mahmoud, "Deep White-balance editing", 2020 IEEE/CVF Conference on Computer Vision and Pattern Recognition (CVPR). https://doi.org/10.1109/cvpr42600.2020.00147.

Afifi, Mahmoud, et al., "Interactive white balancing for camera-rendered images", (2020), Color and Imaging Conference, 28(1), 136-141. https://doi.org/10.2352/issn.2169-2629.2020.28.21.

Afifi, Mahmoud, et al., "When color constancy goes wrong: Correcting improperly white-balanced images", 2019 IEEE/CVF Conference on Computer Vision and Pattern Recognition (CVPR). https://doi.org/10.1109/cvpr.2019.00163.

Anderson, Matthew, et al., "Proposal for a standard default color space for the Internet—sRGB", In Color and Imaging Conference, 1996.

Banić, Nikola, et al., "Unsupervised learning for color constancy", (2018), Proceedings of the 13th International Joint Conference on Computer Vision, Imaging and Computer Graphics Theory and Applications. https://doi.org/10.5220/0006621801810188.

Barron, Jonathan T, "Convolutional Color Constancy", 2015 IEEE International Conference on Computer Vision (ICCV), 2015, pp. 379-387, doi: 10.1109/ICCV.2015.51.

Barron, Jonathan T., et al., "Fast Fourier Color Constancy", (2017). Fast fourier color constancy. 2017 IEEE Conference on Computer Vision and Pattern Recognition (CVPR). https://doi.org/10.1109/cvpr.2017.735.

Barron, Jonathan T., et al., "The Fast Bilateral Solver", In: Leibe, B., Matas, J., Sebe, N., Welling, M. (eds) Computer Vision—ECCV 2016. ECCV 2016. Lecture Notes in Computer Science( ), vol. 9907. Springer, Cham. https://doi.org/10.1007/978-3-319-46487-9_38.

Beigpour, Shida, et al., "Multi-Illuminant Estimation With Conditional Random Fields", In IEEE Transactions on Image Processing, vol. 23, No. 1, pp. 83-96, Jan. 2014, doi: 10.1109/TIP.2013.2286327.

Beigpour, Shida, et al., "Multi-view Multi-illuminant Intrinsic Dataset", In Richard C. Wilson, Edwin R. Hancock and William A. P. Smith, editors, Proceedings of the British Machine Vision Conference (BMVC), pp. 10.1-10.13. BMVA Press, Sep. 2016, https://dx.doi.org/10.5244/C.30.10.

Bianco, Simone, et al., "Color constancy using faces", 2012 IEEE Conference on Computer Vision and Pattern Recognition, Providence, RI, USA, 2012, pp. 65-72, doi: 10.1109/CVPR.2012.6247659.

Bianco, Simone, et al., "Quasi-Unsupervised Color Constancy", 2019 IEEE/CVF Conference on Computer Vision and Pattern Recognition (CVPR), Long Beach, CA, USA, 2019, pp. 12204-12213, doi: 10.1109/CVPR.2019.01249.

Bleier, Michael, et al., "Color constancy and non-uniform illumination: Can existing algorithms work?", 2011 IEEE International Conference on Computer Vision Workshops (ICCV Workshops), Barcelona, Spain, 2011, pp. 774-781, doi: 10.1109/ICCVW.2011.6130331.

Brainard, David H., et al., "Analysis of the RETINEX theory of color vision", (1986), Journal of the Optical Society of America A, 3(10), 1651. https://doi.org/10.1364/josaa.3.001651.

Brainard, David H., et al., "Bayesian color constancy", (1997). Journal of the Optical Society of America A, 14(7), 1393. https://doi.org/10.1364/josaa.14.001393.

Brainard, David H., et al., "Bayesian method for recovering surface and illuminant properties from photosensor responses", Proc. SPIE 2179, Human Vision, Visual Processing, and Digital Display V, (May 1, 1994); https://doi.org/10.1117/12.172687.

Buchsbaum, G., "A spatial processor model for object colour perception", Journal of the Franklin Institute, vol. 310, Issue 1, 1980, pp. 1-26, ISSN 0016-0032, https://doi.org/10.1016/0016-0032(80)90058-7.

Bychkovsky, Vladimir, et al., "Learning photographic global tonal adjustment with a database of input / output image pairs", CVPR 2011, Colorado Springs, CO, USA, 2011, pp. 97-104, doi: 10.1109/CVPR.2011.5995332.

Cardei, Vlad C., et al., "Estimating the scene illumination chromaticity by using a neural network", Journal of the Optical Society of America A, 19(12), 2374-2386 (2002), https://doi.org/10.1364/josaa.19.002374.

Chakrabarti, Ayan, et al., "An Empirical Camera Model for Internet Color Vision", Proceedings of the British Machine Vision Conference (BMVC), pp. 51.1-51.11. BMVA Press, Sep. 2009. doi:10.5244/C.23.51.

Chakrabarti, Ayan, et al., "Modeling Radiometric Uncertainty for Vision with Tone-Mapped Color Images", IEEE Transactions on Pattern Analysis and Machine Intelligence, vol. 36, No. 11, pp. 2185-2198, Nov. 1, 2014, doi: 10.1109/TPAMI.2014.2318713.

Cheng, Dongliang, et al., "Illuminant estimation for color constancy: why spatial-domain methods work and the role of the color distribution", Journal of the Optical Society of America A, 31(5), 1049-1058 (2014), https://doi.org/10.1364/JOSAA.31.001049.

Debev, Paul E., et al., "Recovering High Dynamic Range Radiance Maps from Photographs", Proceedings of the 24th annual conference on Computer graphics and interactive techniques (Siggraph '97). ACM Press/Addison-Wesley Publishing Co., USA, 369-378, (1997). https://doi.org/10.1145/258734.258884.

Do, Yongtae, "Modeling Camera Image Formation Using a Feedforward Neural Network", Open Journal of Applied Sciences, vol. 3 No. 1B, 2013, pp. 75-78. doi: 10.4236/ojapps.2013.31B015.

Ebner, Marc, et al., "Color Constancy", In Katsushi Ikeuchi (ed.), Encyclopedia of Computer Vision. Springer, 2013, http://stubber.math-inf.uni-greifswald.de/~ebner/publications.html.

Finlayson, Graham D., et al., "Color Constancy Under Varying Illumination", Proceedings of IEEE International Conference on Computer Vision, Cambridge, MA, USA, 1995, pp. 720-725, doi: 10.1109/ICCV.1995.466867.

Finlayson, Graham D., "Colour and illumination in computer vision", Interface Focus 8(4), (2018), 20180008. https://doi.org/10.1098/rsfs.2018.0008.

Finlayson, Graham D., et al., "Colour Correction using Root-Polynomial Regression", IEEE Transactions on Image Processing, vol. 24, No. 5, pp. 1460-1470, May 2015, doi: 10.1109/TIP.2015.2405336.

Finlayson, Graham D., "Corrected-Moment Illuminant Estimation", 2013 IEEE International Conference on Computer Vision, Sydney, NSW, Australia, 2013, pp. 1904-1911, doi: 10.1109/ICCV.2013.239.

Finlayson, Graham D., et al., "Gamut constrained illuminant estimation", Proceedings Ninth IEEE International Conference on Computer Vision, Nice, France, 2003, pp. 792-799 vol. 2, doi: 10.1109/ICCV.2003.1238429.

Finlayson, Graham D., et al., "Improving Gamut Mapping Color Constancy", IEEE Transactions on Image Processing, vol. 9, No. 10, pp. 1774-1783, Oct. 2000, doi: 10.1109/83.869188.

Finlayson, Graham D., et al., "Shades of Gray and Colour Constancy", IS&T/SID Twelfth Color Imaging Conference, pp. 37-41, 2004.

Forsyth, D. A., "A novel algorithm for color constancy", International Journal of Computer Vision, 5(1), 5-35, (1990), https://doi.org/10.1007/bf00056770.

Funt, Brian, et al., "Learning color constancy", IS&T/SID Fourth Color Imaging Conference: Color Science, Systems and Applications, Scottsdale, Arizona, November, pp. 58-60, (1996).

Gehler, Peter Vincent, et al., "Bayesian color constancy revisited", 2008 IEEE Conference on Computer Vision and Pattern Recognition, Anchorage, AK, USA, 2008, pp. 1-8, doi: 10.1109/CVPR.2008.4587765.

Gijsenij, Arjan, et al., "Color Constancy for Multiple Light Sources", IEEE Transactions on Image Processing, vol. 21, No. 2, pp. 697-707, Feb. 2012, doi: 10.1109/TIP.2011.2165219.

Gijsenij, Arjan, et al., "Computational Color Constancy: Survey and Experiments", IEEE Transactions on Image Processing, vol. 20, No. 9, pp. 2475-2489, Sep. 2011, doi: 10.1109/TIP.2011.2118224.

Gijsenij, Arjan, et al., "Generalized Gamut Mapping using Image Derivative Structures for Color Constancy", International Journal of Computer Vision 86, 127-139 (2010). https://doi.org/10.1007/s11263-008-0171-3.

(56) References Cited

OTHER PUBLICATIONS

Gijsenij, Arjan, et al., "Improving Color Constancy by Photometric Edge Weighting", IEEE Transactions on Pattern Analysis and Machine Intelligence, vol. 34, No. 5, pp. 918-929, May 2012, doi: 10.1109/TPAMI.2011.197.

Grossberg, Michael D., et al., "Determining the Camera Response from Images: What Is Knowable?", IEEE Transactions on Pattern Analysis and Machine Intelligence, vol. 25, No. 11, pp. 1455-1467, Nov. 2003, doi: 10.1109/TPAMI.2003.1240119.

Hao, Xiangpeng, et al., "A multi-illuminant synthetic image test set", A multi-illuminant synthetic image test set. Color Research & Application, 45(6), 1055-1066, (2020), https://doi.org/10.1002/col.22535.

Hao, Xiangpeng, et al., "Evaluating colour constancy on the new mist dataset of multi-illuminant scenes", Proc. IS&T 27th Color and Imaging Conference, 27(1), 108-113, (2019), https://doi.org/10.2352/issn.2169-2629.2019.27.21.

Hernandez-Juarez, Daniel, et al., "A Multi-Hypothesis Approach to Color Constancy", 2020 IEEE/CVF Conference on Computer Vision and Pattern Recognition (CVPR), Seattle, WA, USA, 2020, pp. 2267-2277, doi: 10.1109/CVPR42600.2020.00234.

Hong, Guowei, et al., "A Study of Digital Camera Colorimetric Characterization Based on Polynomial Modeling", Color Research and Application, vol. 26, No. 1, 76-84, (2001). https://doi.org/10.1002/1520-6378(200102)26:1<76::AID-COL8>3.0.CO;2-3.

\* cited by examiner (B) w/ smoothing loss (A) w/o smoothing loss (A) Input image (B) Deep WB (C) Our predicted blending weights (D) Our AWB

SYSTEM AND METHOD OF WHITE BALANCING A DIGITAL IMAGE WITH MULTIPLE LIGHT SOURCES

TECHNICAL FIELD

The present disclosure relates generally to image capture and processing. More particularly, the present disclosure relates to a system and method of white balancing a digital image.

BACKGROUND

When a digital image is captured, for example with a digital camera, several image processing operations are generally performed to convert the captured scene radiance into an appropriate image; for example, into a visually pleasing or visually accurate image. An image signal processor (ISP) located in the camera, or located remote to the camera, performs these operations in a sequential image processing pipeline to convert the scene-referred image I recorded by the sensor to the final output-referred image O produced by the ISP. Generally, as the input image I is passed through the image processing operations in the pipeline, each operation alters the image until the output image O is produced. Thus, the output image O is dependent on the settings used by the ISP.

SUMMARY

In an aspect, there is provided a method for white balancing an input digital image, comprising: receiving the input digital image in an input color space; downsampling the input image to generate a downsampled image; processing the downsampled image with a plurality of preset white balance settings to generate a plurality of white balanced downsampled images; processing the input image at a fixed white balanced setting to produce an initial image; inputting the white balanced downsampled images to a deep neural network to generate a weighting map, the weighting map comprising weights of the preset white balance settings at windows of the downsampled images; generating a white balanced output image by applying the weighting map to the initial image; and outputting the white balanced output image.

In a particular case of the method, the preset white balance settings and the fixed white balanced setting comprise a color temperature.

In another case of the method, the preset white balance settings comprise a predefined set of color temperatures or tints that each correlate to different lighting conditions.

In yet another case of the method, generating the white balanced output image comprises linearly blending the white balanced downsampled images with the weighting map.

In yet another case of the method, generating the white balanced output image comprises applying a polynomial kernel function on the initial image to project color channels into a higher-dimensional space.

In yet another case of the method, generating the white balanced output image comprises fitting colors of the downsampled image to the mapped image by minimizing a residual sum of squares between the source and target colors in downsampled images.

In yet another case of the method, the weighting map is learned from images rendered in a standard Red, Green, and Blue color space after a full rendering of demosaiced raw images.

In yet another case of the method, the weighting map is learned from a linear raw space.

In yet another case of the method, the deep neural network comprises a GridNet architecture.

In yet another case of the method, the deep neural network receives a three-dimensional tensor of concatenated white balanced downsampled images and outputs a three-dimensional tensor of the weighting map.

In another aspect, there is provided a system for white balancing a digital image, the system comprising one or more processors in communication with data storage, using instructions stored on the data storage, the one or more processors are configured to execute: an input module to receive the input digital image in an input color space; a downsampling module to downsample the input image to generate a downsampled image; an image processing module to process the downsampled image with a plurality of preset white balance settings to generate a plurality of white balanced downsampled images, to process the input image at a fixed white balanced setting to produce an initial image, and to input the white balanced downsampled images to a deep neural network to generate a weighting map, the weighting map comprising weights of the preset white balance settings at windows of the downsampled images; a mapping module to generate a white balanced output image by applying the weighting map to the initial image; and an output module to output the white balanced output image.

In a particular case of the system, the preset white balance settings and the fixed white balanced setting comprise a color temperature.

In another case of the system, the preset white balance settings comprise a predefined set of color temperatures or tints that each correlate to different lighting conditions.

In yet another case of the system, generation of the white balanced output image comprises linearly blending the white balanced downsampled images with the weighting map.

In yet another case of the system, generation of the white balanced output image comprises applying a polynomial kernel function on the initial image to project color channels into a higher-dimensional space.

In yet another case of the system, generation of the white balanced output image comprises fitting colors of the downsampled image to the mapped image by minimizing a residual sum of squares between the source and target colors in downsampled images.

In yet another case of the system, the weighting map is learned from images rendered in a standard Red, Green, and Blue color space after a full rendering of demosaiced raw images.

In yet another case of the system, the weighting map is learned from a linear raw space.

In yet another case of the system, the deep neural network comprises a GridNet architecture.

In yet another case of the system, the deep neural network receives a three-dimensional tensor of concatenated white balanced downsampled images and outputs a three-dimensional tensor of the weighting map. These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
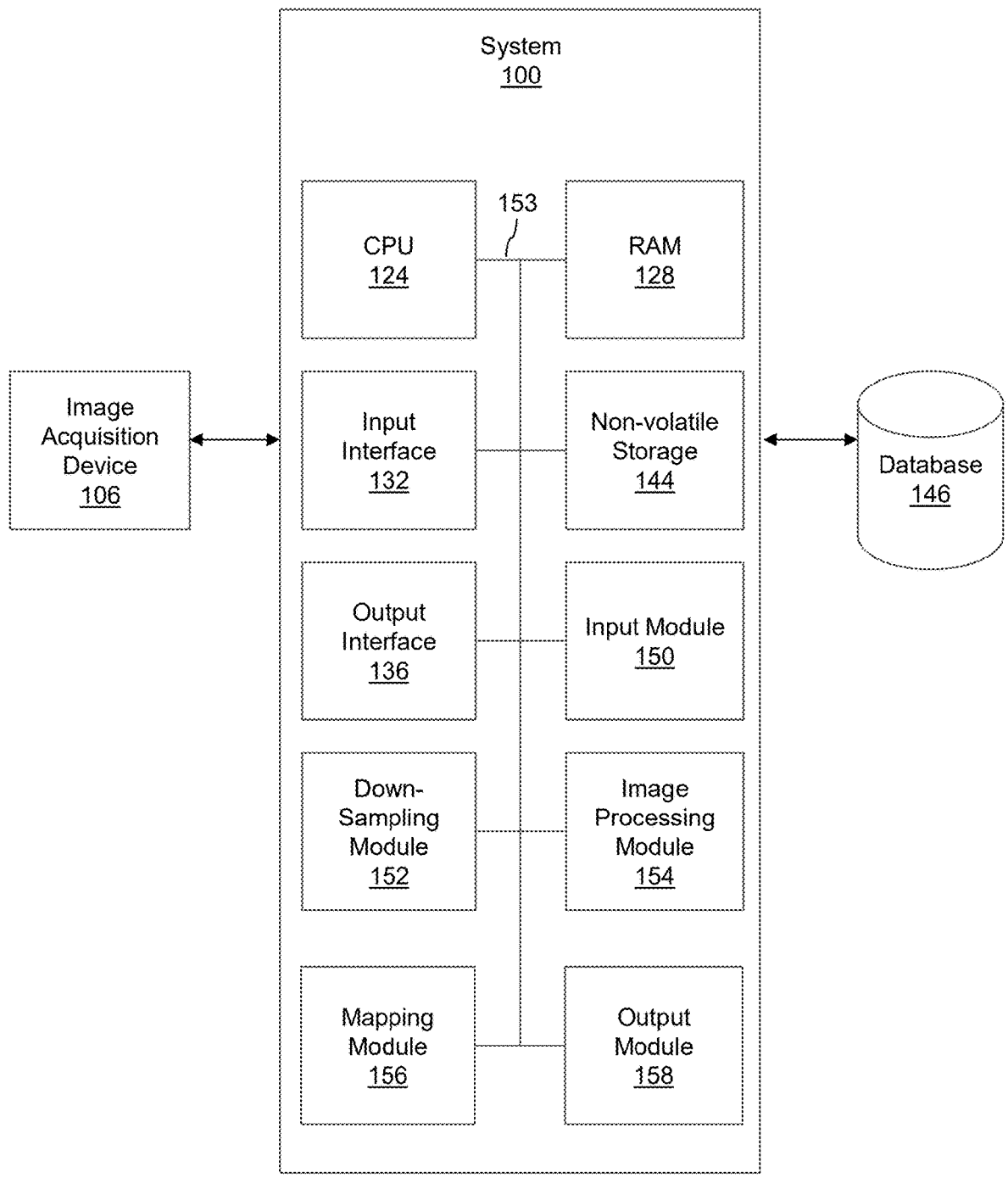
FIG. 1 is a block diagram of a system in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to image capture and processing. More particularly, the following relates to a system and method of white balancing a digital image.

Auto white balance is a procedure applied by a camera's dedicated ISP hardware. The ISP "renders" the sensor image to the final output through a series of processing steps, such as white balance (WB), tone-mapping, and conversion of the final standard RGB (sRGB) output image. A common image processing operation is white balancing (or white balance correction). WB is performed early in the ISP pipeline and aims to remove undesirable color casts caused by the environment lighting. Auto white balance (AWB) attempts to mimic the human visual system's ability to perform color constancy, which allows humans to perceive objects as the same color regardless of scene lighting. Most current techniques for AWB, which include statistical and learning-based methods, correct colors for only a single illumination present in a captured scene. However, real scenes often have mixed (multiple) lighting conditions, just one example of which is a scene with both indoor and outdoor lighting emanating from different source locations. In a mixed-illuminant scenario, a traditional white balance correction will correct for only one of the sources, thus this traditional white balance correction often results in undesirable color tint (typically, reddish or bluish) in the final sRGB image.

The present embodiments are capable of automated white balance correction in mixed-illuminant scenes. The present embodiments do not require illuminant estimation, as is the case in most traditional approaches. Rather, the present embodiments render the captured scene with a finite set of predefined white-balance settings. Given this set of rendered images, the present embodiments use a machine learning process to learn to estimate local weighting maps that are used to blend the rendered images to generate the final corrected image.

While the following describes a scene-referred image I (also referred to as a sensor image, captured image or input image) captured by a camera, it is to be understood that any suitable image capture device and/or sensor can be used; for example, a video-camera, a webcam, a camera capturing light outside of the visible spectrum, or the like.

An image captured by a camera's sensor can be referred to as a scene-referred image I or a "raw" image. After an image is captured, several image processing operations can be performed to convert the scene-referred image I into an appropriately processed image, such as, for example, a visually pleasing or visually accurate image. An ISP can perform these image processing operations by following a given image processing pipeline. The image processing pipeline is thus used to convert the scene-referred image I recorded by the camera's sensor to the final output-referred image O (also referred to generally as the output image). Generally, as the input image I is passed through the image processing operations in the pipeline, each operation alters the image until the output image O is produced.

Turning to FIG. 1, shown therein is a diagram for a system for processing of a captured image to facilitate automated white balancing, in accordance with an embodiment. The system includes the components required to implement the ISP as well as the remaining functions of the method described herein.

The system 100 can include a number of physical and logical components, including a central processing unit ("CPU") 124 which may be or include a graphics processing unit (GPU), random access memory ("RAM") 128, an input interface 132, an output interface 136, memory comprising non-volatile storage 144, and a local bus 153 enabling CPU 124 to communicate with the other components. CPU 124 can include one or more processors. RAM 128 provides relatively responsive volatile storage to CPU 124. The input interface 132 enables a user to provide input via, for example, a touchscreen for initiating the capture of an image. The output interface 136 outputs information to output devices, for example, to the touchscreen. Non-volatile storage 144 can store computer-executable instructions for implementing the system 100, as well as any derivative or other data. In some cases, this data can be stored or synced with a database 146, that can be local to the system 100 or remotely located (for example, a centralized server or cloud repository). During operation of the system 100, data may be retrieved from the non-volatile storage 144 and placed in RAM 128 to facilitate execution. In an embodiment, the CPU 124 can be configured to execute various modules, for example, an input module 150, a down-sampling module 152, an image processing module 154, a mapping module 156, and an output module 158.

In an embodiment, the system 100 can be located on an image capture device 106; such as a camera. In this case, the system can be implemented, for example, with general or specialized computing components, or with a system-on-chip (SoC) implementation. In other cases, the system 100 can be located separate or remote from the image capture device 106. In this case, the system 100 may receive the data comprising the scene-referred image I 302 via a communication link or network, for example, the Internet.

Figure 3:
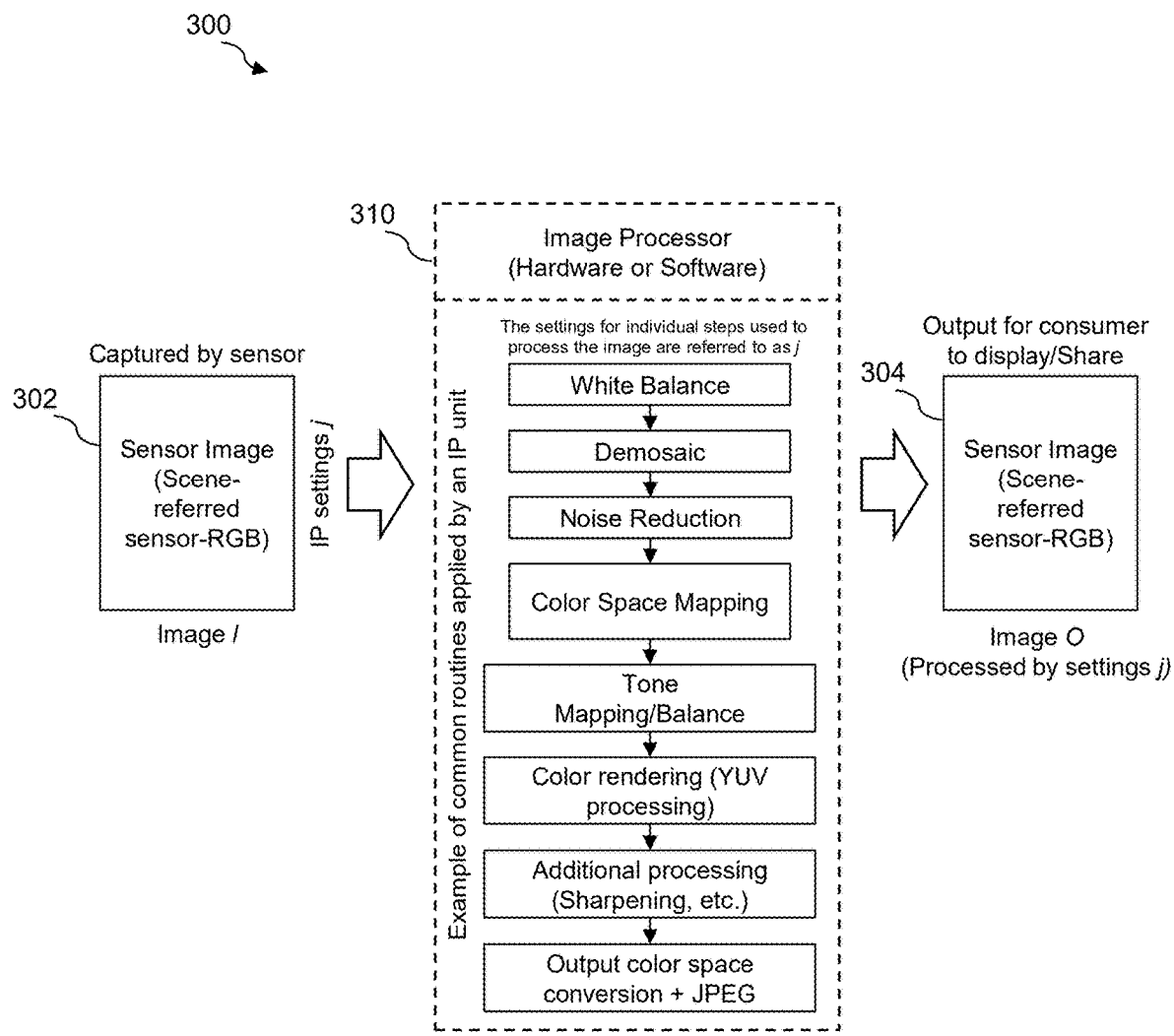
FIG. 3 is an example of an image processing pipeline.

FIG. 3 shows a block diagram illustrating an example camera pipeline 300 according to certain image processing approaches. The input image I 302 is in the color space of the camera's sensors. The input image I 302 is then processed by the ISP to produce the output image O 304 by passing the input image I through an image processing pipeline 310. The image processing pipeline includes a number of individual steps/operations/routines arranged sequentially, as shown in FIG. 3. Such steps/operations/routines can include, for example, white balance, denoising, demosaicing, color space mapping, and the like. In some cases, one or more of these routines may have settings that can be selected by the user, or other parameters.

The output image O 304 (also referred to herein as output image) is generated in an output-referred color space, for example, standard RGB (sRGB), AdobeRGB, YUV, or the like. The output image may be stored locally or uploaded to an external database or cloud storage. The output image may be compressed and stored in a format such as JPEG. In this way, output image O 304 represents the input image I 302 processed by the ISP pipeline 310 with a particular set of settings.

Figure 2:
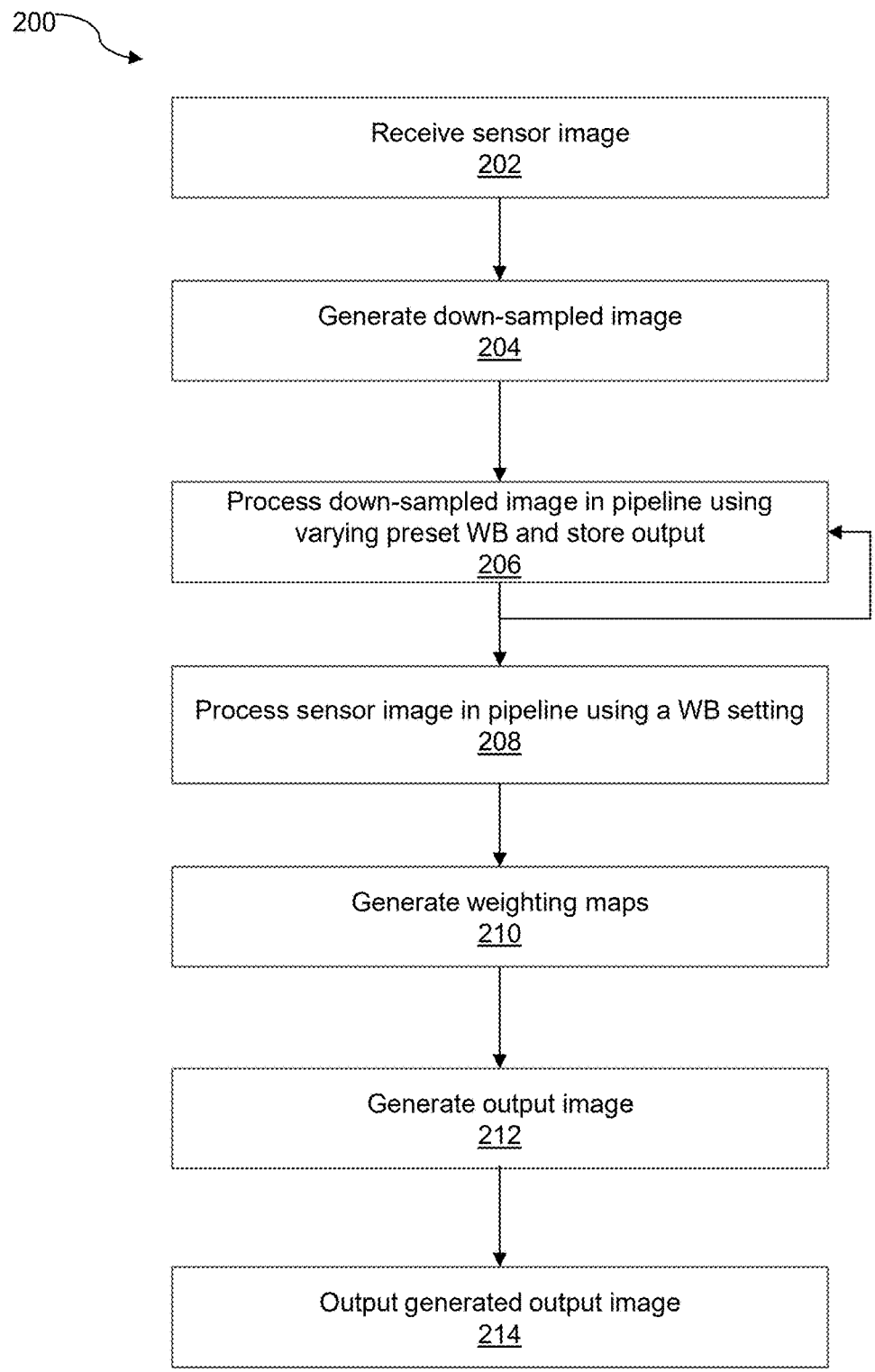
FIG. 2 is a flowchart illustrating a method in accordance with an embodiment.
Figure 4:
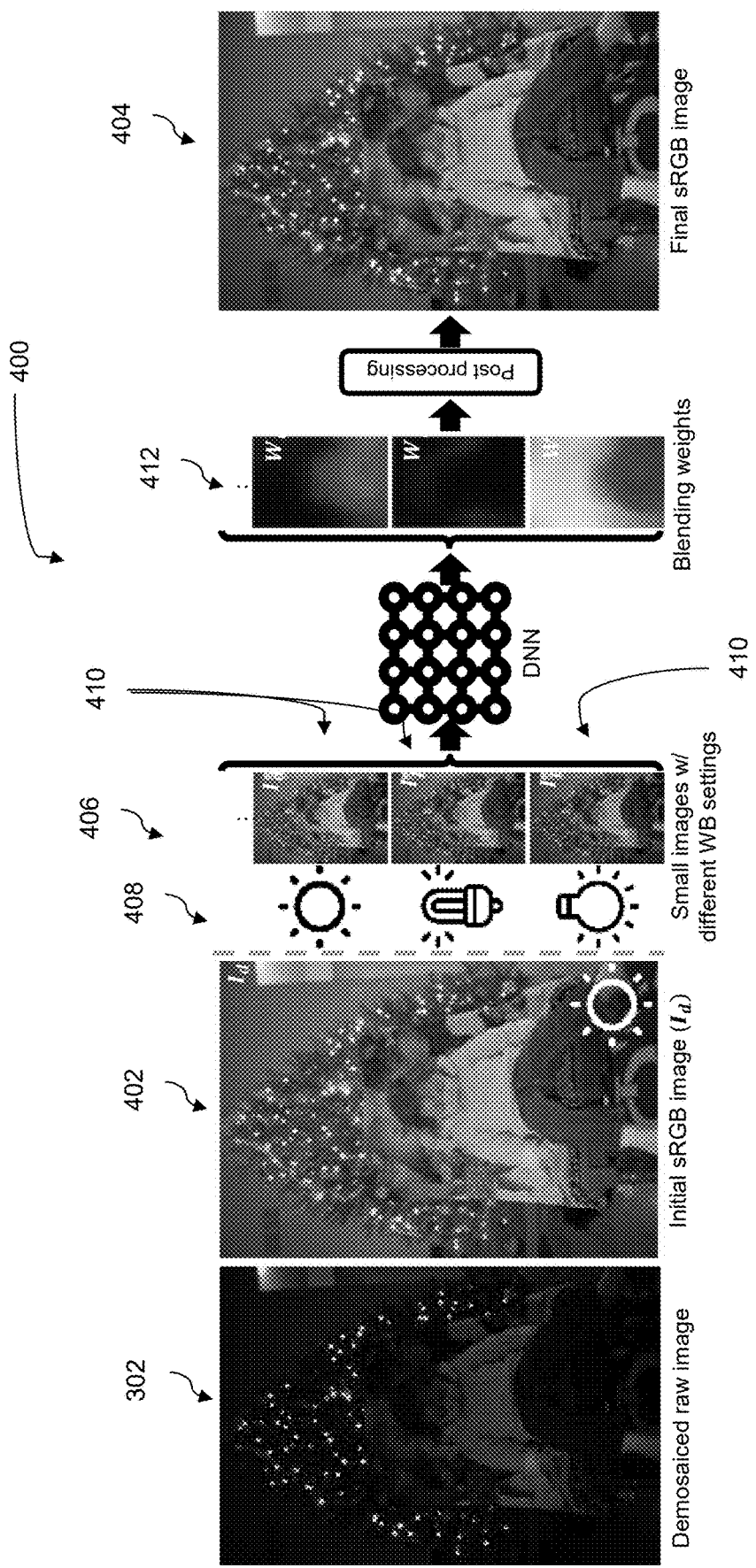
FIG. 4 is a block diagram illustrating the method of FIG. 2.

Turning to FIG. 2 and FIG. 4, an automated white balance correction method 200 is shown for a high-resolution scene-referred image I 302 that is captured and stored in memory.

At block 202, the input module 150 receives an input image I from, for example, a camera sensor on an image acquisition device 106 or from a database 146. In some cases, the input image I can be referred to as a "raw image."

Blocks 204 to 212 generally illustrate the generation of an output image. At block 204, the down-sampling module 152 generates a down-sampled image s of the input image I. An exemplary approach for producing the set of $\{I_{c_i\downarrow}\}$ is provided in the inventors' PCT publication no. WO/2020/206539, reproduced in part below.

The down-sampled image s contains a fraction of the resolution of the input image I; for example, $\frac{1}{50}^{th}$ the resolution of the input image I.

The down-sampling module 152 can use any suitable approach to down-sample images. For example, performing an interpolating or weighted averaging function that averages pixels in a given window that is related to the size of the down sampled image; in this case, effectively the average color in this window is recorded for the down-sampled image. In a particular example, nearest-neighbor interpolation can be used that down-samples the image by taking samples in either a grid structure or in a more complex structure (e.g., Voronoi diagram). Other more complex algorithms may be used for interpolation in order to reduce the artifacts in the down-sampled image (e.g., bilinear and bicubic interpolations). Other down-sampling techniques include: Box sampling, Mipmap, Fourier-transform-based methods, deep convolutional neural networks (CNNs), pixel skipping, or the like.

The down-sampled image 406 is denoted as s and is intended to be considerably smaller in pixel-size (and thus, data size and processing time) than the high-resolution captured input image I 302; for example, $\frac{1}{10}$, $\frac{1}{20}$, $\frac{1}{30}$, or $\frac{1}{50}$ times the size of input image I. A specific example of a suitable image size is 384×384 pixels, though the specific size may vary depending on processing capabilities, the original input image size, and desired results.

At block 206, the down-sampled image 406 is then processed by the image processing module 154 in the image processing pipeline at a plurality of pre-set color temperatures to produce a plurality of white balanced down-sampled images $\{I_{c_i\downarrow}\}$ 410. For example, many cameras have pre-set white-balance settings, and $\{k_i\}_{i=1}^{N}$ can be each of these pre-set white-balance settings. In this example, each of the white-balance pre-set settings can be related to a color temperature (for example, 2500K, 2850K, 3800K, 5500K, 6500K, or the like). The number of small images and pre-sets to be used can be varied based on the application, the availability of training data, the desired level of "correctness", etc. Preferably, the selection of the small image resolution and the number of pre-sets is sufficient that processing such small images through the ISP for additional few times requires negligible processing time, and thus it does not materially affect the real-time processing offered by the camera viewfinder. The resulting output down-sampled images $\{I_{c_i\downarrow}\}$ 410 are stored in memory.

Thus, the automated white balance correction method 400 as a whole observes the same scene object colors under a fixed set of WB settings.

At block 208, the input image I 302 is processed by the image processing module 154 in the ISP at a fixed WB setting and in its native resolution (or other typical high resolution) to provide an initial sRGB image 402. The fixed WB setting could be the default for the image capture device or any WB setting within a predefined range. An example is a fixed color temperature such as 5500K.

Beginning at block 210, the image processing module 154 performs auto WB/photofinishing. In the photofinishing stage, the small images are used to generate a weighting map to map the colors of the high-resolution sRGB image to a WB corrected output in accordance with:

$$\hat{I}_{c_i} = M_{c_i} \phi(I_{init}), \quad (2)$$

where $I_{init}$ is the initial high-resolution input image rendered with the fixed WB setting (initial sRGB image 402), $\hat{I}_{c_i}$ is the mapped image to the target WB setting $c_i$, $\phi(\cdot)$ is a polynomial kernel function that projects the R, G, B channels into a higher-dimensional space, and $M_{c_i}$ is a mapping matrix computed by fitting the colors of $I_{init}$, after downsampling, to the corresponding colors of $I_{c_i}\!\downarrow$. This fitting is computed by minimizing the residual sum of squares between the source and target colors in both small images. Exemplary polynomial kernel functions are those described the inventors' PCT publication no. WO/2020/206539, and particularly in Table 1 thereof, though other suitable functions may be used.

The image processing module 154 applies a single WB correction that corrects for a fixed color temperature (e.g., 5500 K) in addition to generating small images (e.g. 384×384) with a predefined set of color temperatures (e.g., 2850K, 3800K) and/or tints that correlate to the common lighting conditions (e.g., incandescent, fluorescent). Given these images, the image processing module 154 predicts blending weights 412 to produce the final AWB result 404.

The corrected WB is generated by linearly blending among the different WB settings. That is, given a set of small sRGB images $\{I_{c_1}\!\downarrow, I_{c_2}\!\downarrow, \ldots\}$, each of which was rendered with a different WB setting (i.e., $c_1, c_2, \ldots$), the final spatially varying WB colors are computed as follows:

$$I_{corr\downarrow} = \sum_i W_i \odot I_{c_i\downarrow},$$

where $I_{corr\downarrow}$ is the corrected small image, i is for indexing, $\odot$ is Hadamard product, and $W_i \in \mathbb{R}^{w \times h \times 3}$ is the weighting map for the $i^{th}$ small image rendered with the $c_i$ WB setting. Here, w and h refer to the width and height of the small images, respectively. For simplicity, $W_i$ may be considered a replicated monochromatic image to match the dimensions of Ii. As noted above, an example of a suitable small image size is 384×384 pixels (i.e., w=h=384).

The weighting maps, $\{W_i\}$, may be learned for the images rendered in the sRGB space, after a full rendering of demosaiced raw images, in order for the automated white balance correction method to be device-independent. Alternatively, the weighting maps may be learned in the linear raw space.

Block 210 illustrates the generating of weighting maps, in which the values of $W_i$ are estimated given the set $\{I_{c_i}\!\downarrow\}$.

Figure 5A:
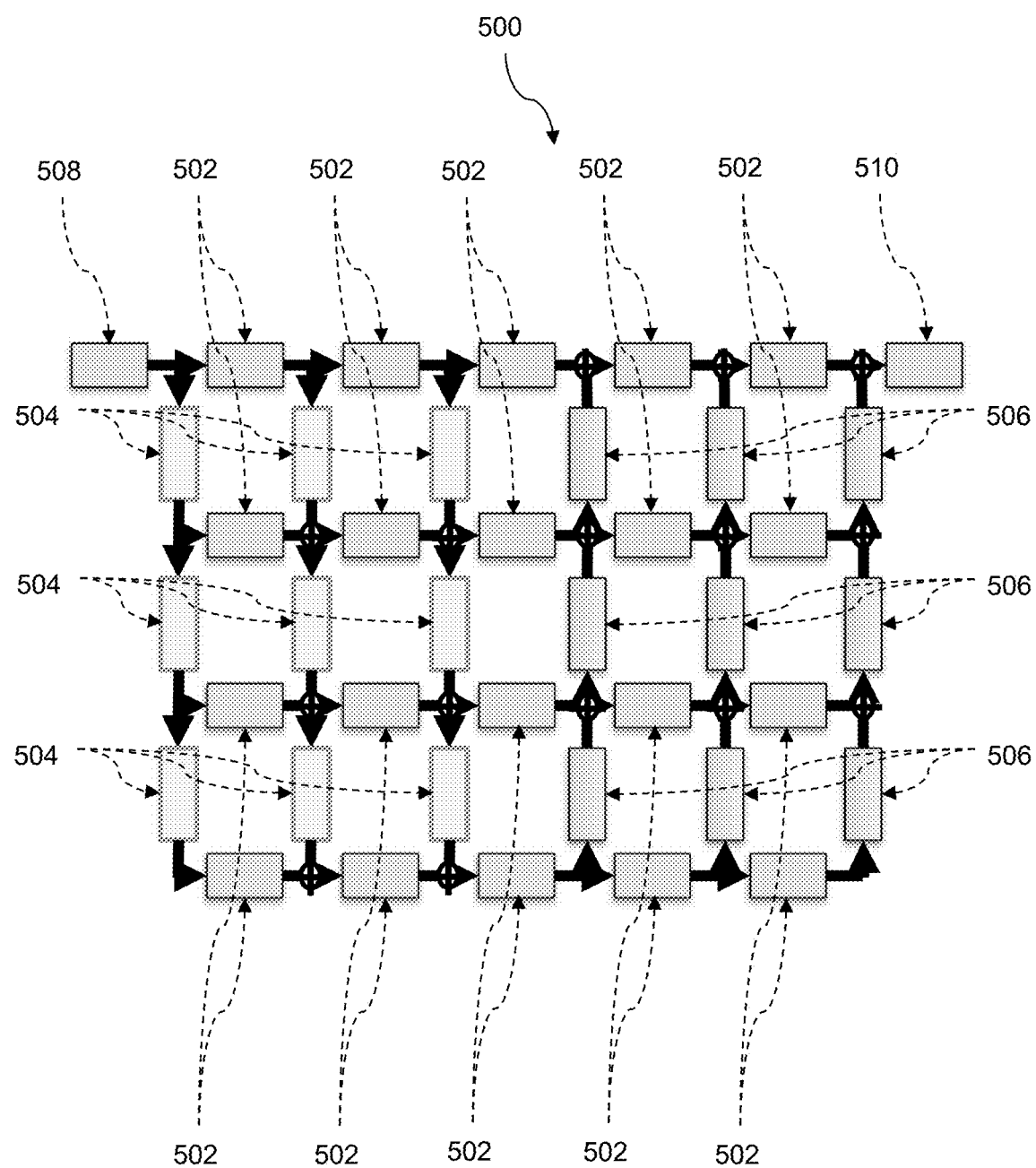
FIG. 5A is a block diagram of a deep neural network in accordance with an embodiment.
Figure 5B:
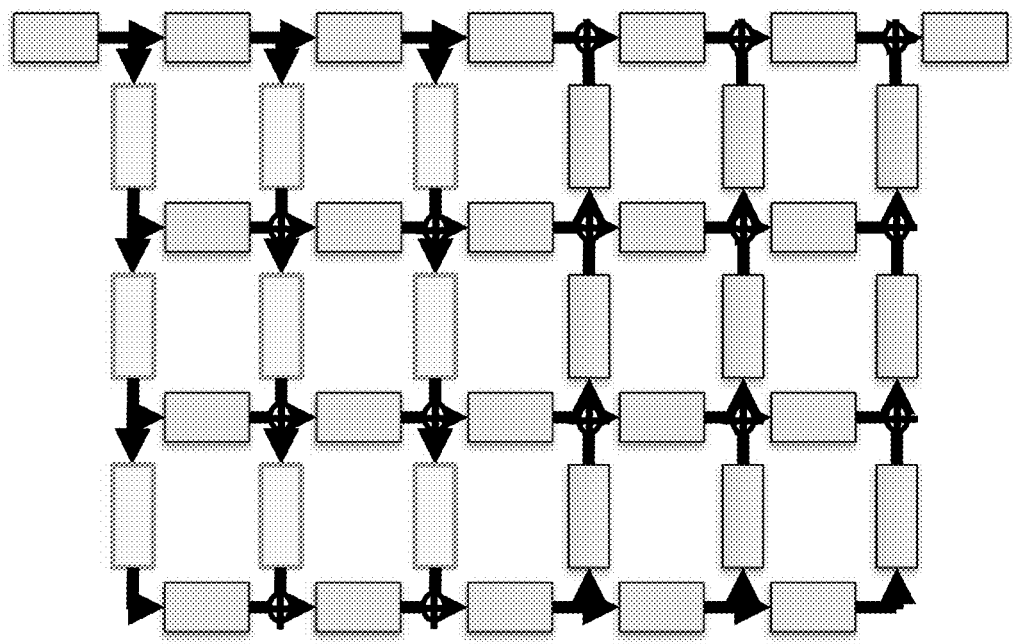
FIG. 5B is another copy of the block diagram of FIG. 5A not including element numbering, for clarity.

Referring now to FIG. 5A, an exemplary deep neural network (DNN) is shown. FIG. 5B is the same DNN as FIG. 5A without element numbering, for the reader's convenience. An exemplary DNN is the GridNet architecture as shown. The DNN is used to predict the values of $\{W_i\}$, where the DNN takes as input the small images rendered with predefined WB settings, and learns to produce proper weighting maps $\{W_i\}$. Specifically, the DNN accepts a 3D tensor of concatenated small images and produces a 3D tensor of the weighting maps.

The illustrated DNN 500 consists of six columns and four rows, and three main units, which are the residual unit 502, the downsampling unit 504, and the upsampling unit 506. The rows comprise residual units 502 that interconnect the columns. The first, second and third column are comprised of downsampling units 504 and the fourth, fifth and sixth rows are comprised of upsampling units 506. An input residual unit 508 and output residual unit 510 are provided at terminal ends of the DNN. The parameters of these units changes according to the number of the concatenated white-balanced images (corresponding to k, described below), and, in the terminal end, the output channels of the last conv layer is k (i.e., it produces a tensor with k channels, where k is the number of concatenated white-balanced input images).

Figure 6:
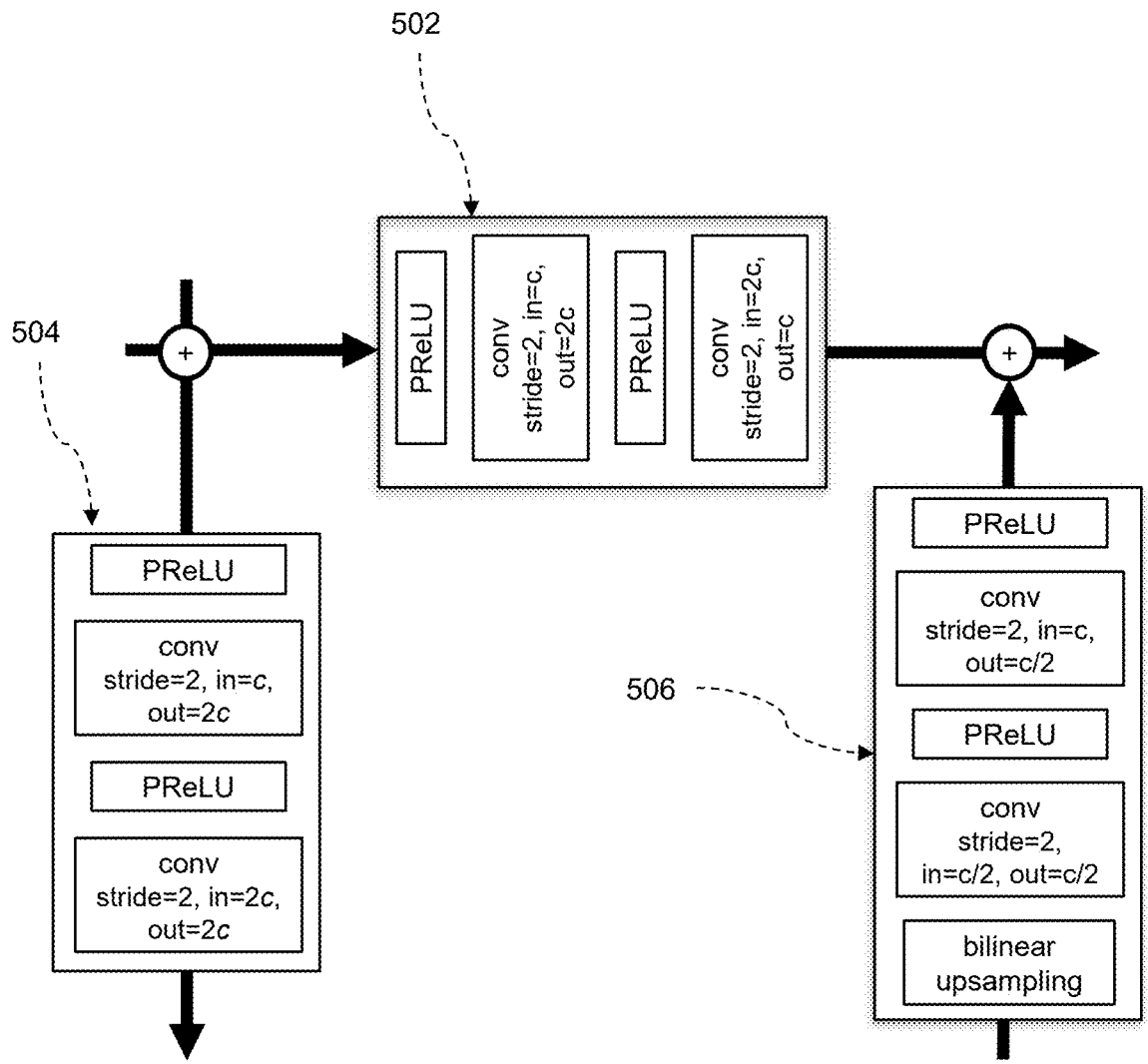
FIG. 6 is a block diagram of a residual unit, downsampling unit and upsampling unit.

FIG. 6 illustrates the three main units of the DNN 500 and specifically the arrangement of the three main units along between its $3^{rd}$ and $4^{th}$ columns. In FIG. 6, the symbol c refers to the number of channels in each convolutional layer. The residual unit 502 comprises an input PReLU layer; first convolutional layer having c input channels, 2c output channels, stride=2; second PReLU layer; and second convolutional layer having 2c input channels, c output channels, stride=2. The downsampling unit 504 comprises an input PReLU layer; first convolutional layer having c input channels, 2c output channels, stride=2; second PReLU layer; and second convolutional layer having 2c input channels, 2c output channels, stride=2. The upsampling unit 506 comprises an input PReLU layer; first convolutional layer having c input channels, c/2 output channels, stride=2; second PReLU layer; second convolutional layer having c/2 input channels, c/2 output channels, stride=2; and bilinear upsampling layer.

The input residual unit 508 accepts concatenated input images with 3×k channels, where k refers to the number of images rendered with k WB settings. For example, when using WB={t, d, s}, the value of k is three. Regardless of the value of k, the number of output channels of the input residual unit 508 may be set to eight.

Each residual unit 502 (except for the input residual unit 508), produces features with the same dimensions of the input feature. For the first three columns, the dimensions of each feature received from the upper row are reduced by two, while the number of output channels is duplicated, as shown in the downsampling unit. In contrast, the upsampling unit increases the dimensions of the received features by two in the last three columns. Lastly, the output residual unit produces output weights with k channels. It will be appreciated that the DNN shown in FIG. 5 is exemplary in nature, and another suitable DNN architecture that accepts concatenated input images with 3×k channels could be used.

The DNN may be trained with a suitable dataset. Such a dataset preferably has a significant quantity of training images comprising a ground truth sRGB Image rendered with an accurate WB correction and a plurality of corresponding sRGB variant images being the same scene as the ground truth image rendered with different color temperatures. The scenes in the dataset may include, or be exclusively, of single-illuminant scenes for which the ground truth sRGB image can be rendered with prior techniques.

An example of a suitable dataset is a dataset of raw images (input, rendered with different white-balance settings and the corresponding ground-truth both in raw space). Alternatively, the images may be in sRGB, AdobeRGB or YUV.

Another example of a suitable dataset is described in the inventors' prior U.S. Pat. No. 11,044,450. Such a dataset can be generated from any set of raw images captured with calibration object (e.g., color chart) placed in each scene to get the corresponding ground-truth image.

From the dataset, one may select, for example, 9,200 training images that were rendered with "camera standard" photofinishing and with the following color temperatures: 2850K, 3800K, 5500K, 6500K, and 7500K, which correspond to the following WB settings: tungsten (also referred to as incandescent), fluorescent, daylight, cloudy, and shade, respectively. The DNN is then trained to minimize the following reconstruction loss function:

$$\mathcal{L}_r = \|P_{corr} - \Sigma_i \hat{W}_i \odot P_{c_i}\|_F^2, \quad (3)$$

where $\|\cdot\|_F^2$ computes the squared Frobenius norm, $P_{corr}$ and $P_{c_i}$ are the extracted training patches from ground-truth sRGB images and input sRGB images rendered with the $c_i$ WB setting, respectively, and $\hat{W}_i$ is the blending weighting map produced by the DNN for $P_{c_i}$.

To avoid producing out-of-gamut colors in the reconstructed image, a cross-channel softmax operator may be applied to the output tensor of the DNN before computing loss in Equation 3.

The following regularization term may be applied to the produced weighting maps to encourage the DNN to produce smooth weights:

$$\mathcal{L}_s = \Sigma_i \|\hat{W}_i * \nabla_x\|_F^2 + \|\hat{W}_i * \nabla_y\|_F^2 \quad (4)$$

where $\nabla_x$ and $\nabla_y$ are 3×3 horizontal and vertical Sobel filters, respectively, and * is the convolution operator. Thus, the final loss is computed as follows:

$$\mathcal{L} = \mathcal{L}_r + \lambda \mathcal{L}_s, \quad (5)$$

where $\lambda$ is a scaling factor to control the contribution of $\mathcal{L}_s$ to the final loss.

In experiments, an example value used was $\lambda=100$. Minimizing the loss in Equation 5 was performed using the Adam optimizer with $\beta_1=0.9$ and $\beta_2=0.999$ for 200 epochs. A mini-batch size of 32 was selected, where at each iteration eight training images were randomly selected, alongside their associated images rendered with the predefined WB set, and four random patches from each of the selected training images were extracted.

At inference time, small images with the predefined WB settings are produced as described above. These images are concatenated and fed to the DNN, which produces the weighting maps. To improve the final results, an ensembling strategy may be applied, where the concatenated small images are fed to the DNN in three different scales: 1.0, 0.5, 0.25. Then, the produced weights may be upsampled to the high-resolution image size. The average weighting maps may then be calculated for each WB setting. This ensemble strategy produces weights with more local coherence. This coherence can be further improved by applying a post-processing edge-aware smoothing step. That is, the high-resolution images (i.e., the initially rendered one with the fixed WB setting and the mapped images produced by Equation 2) may be used as a guidance image to post-process the generated weights. The fast bilateral solver may be utilized for this task.

After the generation of upsampled weighting maps $\{\hat{W}_{i\uparrow}\}$, at block 212, the final output image 404 is generated by the mapping module 156 as described in the following equation:

$$I_{corr} = \Sigma_i \hat{W}_{i\uparrow} \odot \hat{I}_{c_i}. \quad (6)$$

At block 214, the output module 158 outputs the white balanced output image, or the weighting maps, or both, to the output interface 136 or the database 146, or both.

The inventors conducted several experiments to validate the techniques described above. These are now explained below but parameters and results described herein are not intended to be limiting nor promises of results.

Several experiments were conducted to evaluate the methods. In all experiments, the fixed WB setting was set to 5500 K (i.e., daylight WB). Two different predefined WB sets were examined to render the small images, which are: (i): {2850 K, 3800 K, 6500 K, 7500 K} and (ii) {2850 K, 7500 K}. These two sets represent the following WB settings: {tungsten, fluorescent, cloudy, and shade} and {tungsten, shade}, respectively. The DNN received the concatenated images, along with the downsampled daylight image. Thus, the first predefined WB set is referred to as {t, f, d, c, s} and the second set is referred to as {t, d, s}, where the terms t, f, d, c, and s refer to tungsten, fluorescent, daylight, cloudy, and shade, respectively.

When WB={t, d, s} is used, the DNN takes ~0.6 seconds on average without ensembling, while it takes ~0.9 seconds on average when ensembling is used. This processing time is reported using a single NVIDIA™ GeForce™ GTX 1080 graphics card. When WB={t, f, d, c, s} is used, the DNN takes ~0.8 seconds and ~0.95 seconds on average to process with and without ensembling, respectively.

The average CPU processing time of the post-processing edge-aware smoothing for images with 2K resolution is ~3.4 seconds and ~5.7 seconds with WB={t, d, s} and WB={t, f, d, c, s}, respectively. This post-processing step is optional and its processing time can be reduced with a GPU implementation of the edge-aware smoothing step.

Three different datasets were used to evaluate the method. The scenes and camera models present in these evaluation sets were not part of the training data.

Cube+ dataset. As the Cube+ dataset is commonly used by prior color constancy work, the inventors used the linear raw images provided in the Cube+ dataset to evaluate the method for single-illuminant scenes. Specifically, the inventors used the raw images in order to generate the small images to feed them into the DNN.

MIT-Adobe 5K dataset: The inventors selected a set of mixed-illuminant scenes from the MIT-Adobe 5K dataset for qualitative comparisons. Similar to the Cube+ dataset, the MIT-Adobe 5K dataset provides the linear raw DNG file of each image, which facilitates the small image rendering process. This set is used to compare results against the traditional camera AWB results by using the "as-shot" WB values stored in each DNG raw file.

Inventors' mixed-illuminant test set: The inventors generated a synthetic test set to quantitatively evaluate mixed-illuminant scene WB methods. To generate the test set, the inventors started with 3D scenes modeled in Autodesk 3Ds Max. The inventors added multiple light sources in each scene, such that each scene has at least two types of light sources (e.g., indoor and outdoor lighting). For each scene, the inventors set the virtual camera in different poses and used different color temperatures (e.g., 28500 K, 5500 K) for the camera AWB setting. Then, the inventors rendered the final scene images using Vray rendering to generate realistic photographs. In total, the inventors rendered 150 images with mixed lighting conditions. Each image comes with its associated ground-truth image. To render the ground-truth images, the inventors set the color temperature of the virtual camera's WB and all light sources in the scene to 5500 K (i.e., daylight). Note that setting the color temperature does not affect the intensity of the final rendered image pixels, but only changes the lighting colors. In comparison with existing multi-illuminant datasets, the test set is the first set that includes images rendered with different WB settings along with the corresponding ground-truth images rendered with correctly white-balanced pixels in the rendering pipeline.

Figure 7:
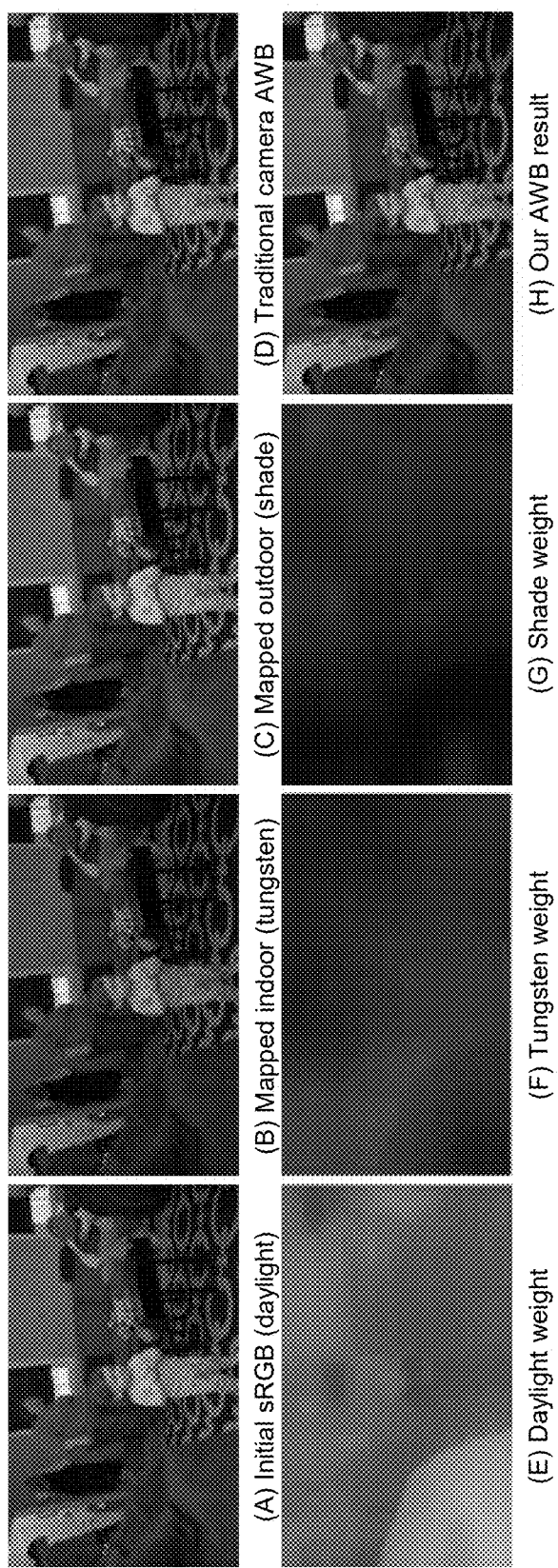
FIG. 7, FIG. 8, FIG. 9, FIG. 10, FIG. 11 and FIG. 12 are each examples of applying the present techniques to example images.
Figure 8:
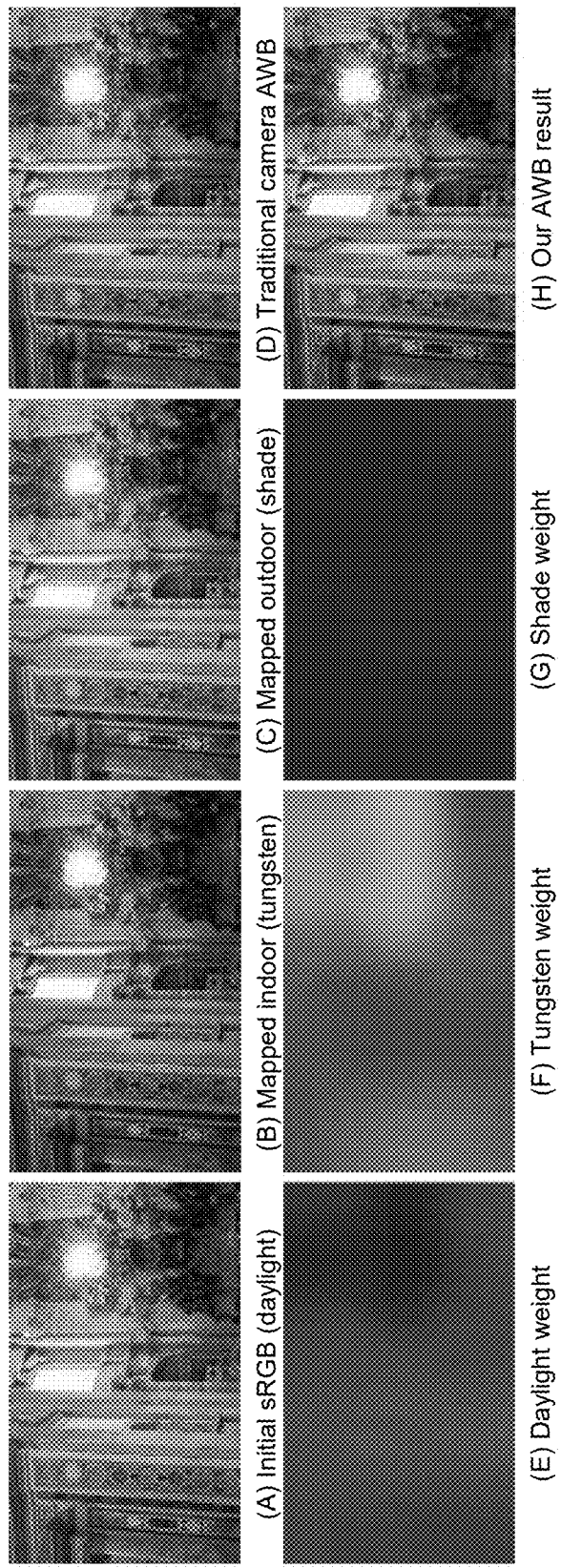
Figure 9:
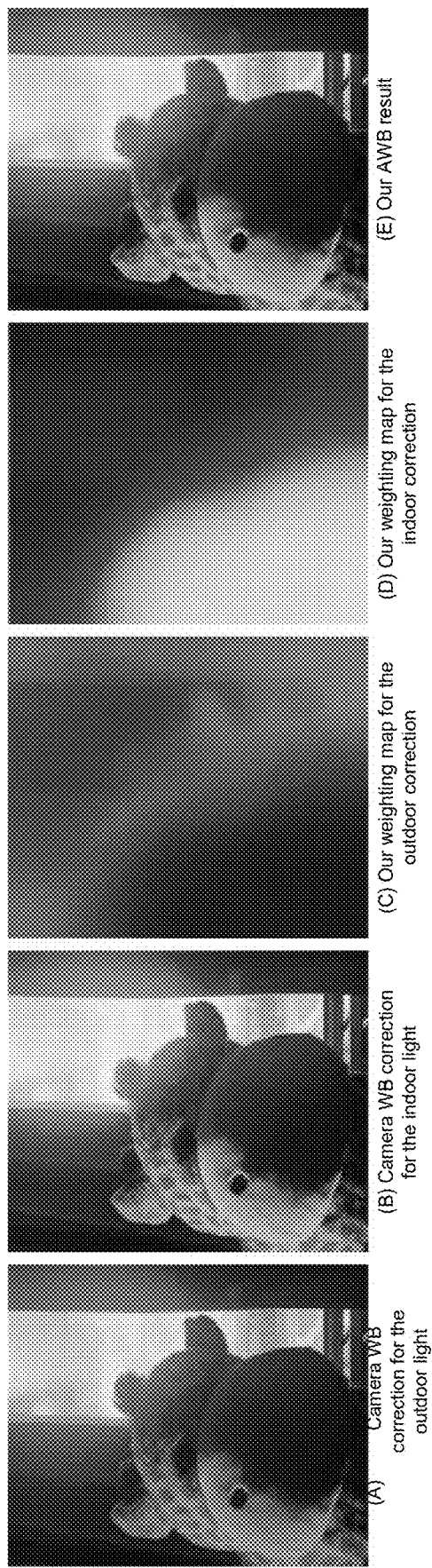

FIG. 7 and FIG. 8 show examples of the generated blending weights. In this figure, results of the present method, shown in FIG. 7(H) and FIG. 8(H), are contrasted with the traditional camera AWB results, shown in FIG. 7(D) and FIG. 8(D), respectively. The initial sRGB image rendered with the fixed WB setting (i.e., daylight), along with the mapped images to the predefined WB settings, as described in Equation 2, are also shown. As can be seen, the present method learned to produce proper blending weights to locally white-balance each region in the captured scene.

Figure 10:
Figure 10:

Table 1 and FIG. 10 show the results of the method when training with and without using the smoothing loss term ($\mathcal{L}_s$). In addition, Table 1 shows the results of training the DNN without keeping the same order of concatenated small images during training. That is, the order of concatenated small images may be shuffled before feeding the images to the network during training to see if that would affect the

TABLE 1

| Method | MSE | | | | MAE | | | | ΔE 2000 | | | | Size |
|---|---|---|---|---|---|---|---|---|---|---|---|---|---|
| | Mean | Q1 | Q2 | Q3 | Mean | Q1 | Q2 | Q3 | Mean | Q1 | Q2 | Q3 | |
| FC4 | 371.9 | 79.15 | 213.41 | 467.33 | 6.49° | 3.34° | 5.59° | 8.59° | 10.38 | 6.6 | 9.76 | 13.26 | 5.89 MB |
| Quasi-U CC | 292.18 | 15.57 | 55.41 | 261.58 | 6.12° | 1.95° | 3.88° | 8.83° | 7.25 | 2.89 | 5.21 | 10.37 | 622 MB |
| KNN WB | 194.98 | 27.43 | 57.08 | 118.21 | 4.12° | 1.96° | 3.17° | 5.04° | 5.68 | 3.22 | 4.61 | 6.70 | 21.8 MB |
| Interactive WB | 159.88 | 21.94 | 54.76 | 125.02 | 4.64° | 2.12° | 3.64° | 5.98° | 6.2 | 3.28 | 5.17 | 7.45 | 38 KB |
| Deep WB | 80.46 | 15.43 | 33.88 | 74.42 | 3.45° | 1.87° | 2.82° | 4.26° | 4.59 | 2.68 | 3.81 | 5.53 | 16.7 MB |
| Our results | | | | | | | | | | | | | |
| p = 256, WB = {t, f, d, c, s} | 235.07 | 54.42 | 83.34 | 197.46 | 6.74° | 4.12° | 5.31° | 8.11° | 8.07 | 5.22 | 7.09 | 10.04 | 5.10 MB |
| p = 128, WB = {t, f, d, c, s} | 176.38 | 16.96 | 35.91 | 115.50 | 4.71° | 2.10° | 3.09° | 5.92° | 5.77 | 3.01 | 4.27 | 7.71 | 5.10 MB |
| p = 64, WB = {t, f, d, c, s} | 161.80 | 9.01 | 19.33 | 90.81 | 4.05° | 1.40° | 2.12° | 4.88° | 4.89 | 2.16 | 3.10 | 6.78 | 5.10 MB |
| p = 64, WB = {t, f, d, c, s}, w/o $\mathcal{L}_S$ | 189.18 | 11.10 | 23.66 | 112.40 | 4.59° | 1.57° | 2.41° | 5.76° | 5.48 | 2.38 | 3.50 | 7.80 | 5.10 MB |
| p = 64, WB = {t, f, d, c, s}, w/shuff. | 197.21 | 24.48 | 55.77 | 149.95 | 5.36° | 2.60° | 3.90° | 6.74° | 6.66 | 3.79 | 5.45 | 8.65 | 5.10 MB |
| p = 64, WB = {t, d, s} | 168.38 | 8.97 | 19.87 | 105.22 | 4.20° | 1.39° | 2.18° | 5.54° | 5.03 | 2.07 | 3.12 | 7.19 | 5.09 MB |

Table 1 shows the results of the present AWE method on the single-illuminant Cube+ dataset. Table 1 includes the results of several ablation studies, where the DNN is trained with different WE settings and patch sizes (p). The terms t, f, d, c, and s refer to tungsten, fluorescent, daylight, cloudy, and shade, respectively. Table 1 reports the mean, first, second (median), and third quantile (Q1, Q2, and Q3) of mean square error (MSE), mean angular error (MAE), and ΔE 2000. For all diagonal-based methods, gamma linearization is applied. The top results are indicated with yellow and bold, while the second and third best results are indicated with green and red, respectively.

In this table, the results of a set of ablation studies conducted shows the impact of some training options. Specifically, the table shows the results of training the DNN network on the following patch sizes (p): 256×256, 128×128, and 64×64 pixels.

accuracy. As shown in Table 1, using a fixed order achieves better results as that helps the DNN to build knowledge on the correlation between pixel colors when rendered with different WB settings and the generated weighting maps. Table 1 also shows that when comparing the present method with recent methods for WB correction, the present method achieves very competitive results, while requiring small memory overhead compared to the state-of-the-art methods.

Table 2 reports the results of the present method, along with the results of recently published methods for WB correction in sRGB space, on the synthetic test set. As shown, the present method achieves the best results over most evaluation metrics. Table 2 shows the results when training the present method using different predefined sets of WB settings.

TABLE 2

| Method | MSE | | | | MAE | | | | ΔE 2000 | | | |
|---|---|---|---|---|---|---|---|---|---|---|---|---|
| | Mean | Q1 | Q2 | Q3 | Mean | Q1 | Q2 | Q3 | Mean | Q1 | Q2 | Q3 |
| Gray pixel | 4959.20 | 3252.14 | 4209.12 | 5858.69 | 19.67° | 11.92° | 17.21° | 27.05° | 25.13 | 19.07 | 22.62 | 27.46 |
| Grayness index | 1345.47 | 727.90 | 1055.83 | 1494.81 | 6.39° | 4.72° | 5.65° | 7.06° | 12.84 | 9.57 | 12.49 | 14.60 |
| KNN WB | 1226.57 | 680.65 | 1062.64 | 1573.89 | 5.81° | 4.29° | 5.76° | 6.85° | 12.00 | 9.37 | 11.56 | 13.61 |
| Interactive WB | 1059.88 | 616.24 | 896.90 | 1265.62 | 5.86° | 4.56° | 5.62° | 6.62° | 11.41 | 8.92 | 10.99 | 12.84 |
| Deep WB | 1130.598 | 621.00 | 886.32 | 1274.72 | 4.53° | 3.55° | 4.19° | 5.21° | 10.93 | 8.59 | 9.82 | 11.96 |
| Our results | | | | | | | | | | | | |
| p = 64, WB = {t, d, s} | 819.47 | 655.88 | 845.79 | 1000.82 | 5.43° | 4.27° | 4.89° | 6.23° | 10.61 | 9.42 | 10.72 | 11.81 |

TABLE 2-continued

| Method | MSE | | | | MAE | | | | ΔE 2000 | | | |
| --- | --- | --- | --- | --- | --- | --- | --- | --- | --- | --- | --- | --- |
| | Mean | Q1 | Q2 | Q3 | Mean | Q1 | Q2 | Q3 | Mean | Q1 | Q2 | Q3 |
| p = 64, WB = {t, f, d, c, s} | 938.02 | 757.49 | 961.55 | 1161.52 | 4.67° | 3.71° | 4.14° | 5.35° | 12.26 | 10.80 | 11.58 | 12.76 |
| p = 128, WB = {t, d, s} | 830.20 | 584.77 | 853.01 | 992.56 | 5.03° | 3.93° | 4.78° | 5.90° | 11.41 | 9.76 | 11.39 | 12.53 |
| p = 128, WB = {t, f, d, c, s} | 1089.69 | 846.21 | 1125.59 | 1279.39 | 5.64° | 4.15° | 5.09° | 6.50° | 13.75 | 11.45 | 12.58 | 15.59 |

Figure 11:

FIG. 11 shows qualitative comparisons on images from the MIT-Adobe 5K dataset. Results for the present method are shown in FIG. 11(D); traditional camera AWE in FIG. 11(A); after applying the KNN-WE correction in FIG. 11(E); and after applying the deep WE correction in FIG. 11(C). The results indicate that the present method provides better per-pixel correction compared to other alternatives.

Figure 12:
Figure 12:
Figure 12:
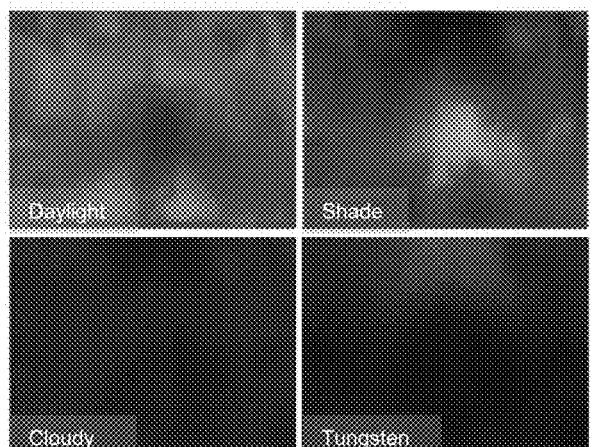
Figure 12:

In an embodiment, to avoid any need to modify the ISP to render small images, the present method can be practices within one of the sRGE WE editing methods to synthesize rendering the small images with the target predefined WE set in post-capture time. FIG. 12 shows an example wherein deep WE is used to generate the small images of a given sRGE camera-rendered image taken from Flickr. As shown, the present method produces a better result compared to the camera-rendered image (i.e., traditional camera AWE) and the deep WE result for post-capture WE correction.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for white balancing an input digital image, comprising:
   receiving the input digital image in an input color space;
   downsampling the input image to generate a downsampled image;
   processing the downsampled image with a plurality of preset white balance settings to generate a plurality of downsampled images each with a distinct target white balance;
   processing the input image at a fixed white balanced setting to produce an initial image;
   inputting the white balanced downsampled images to a deep neural network to generate a weighting map, the weighting map comprising weights of the preset white balance settings at windows of the downsampled images;
   generating a white balanced output image by determining a sum of the weighting map applied to mapped images each with a target white balance, the mapped images each determined by minimizing a residual sum of squares between the colors of the initial image and the downsampled image with the target white balance; and
   outputting the white balanced output image.

2. The method of claim 1, wherein the preset white balance settings and the fixed white balanced setting comprise a color temperature.

3. The method of claim 2, wherein the preset white balance settings comprise a predefined set of color temperatures or tints that each correlate to different lighting conditions.

4. The method of claim 3, wherein generating the white balanced output image comprises linearly blending the white balanced downsampled images with the weighting map.

5. The method of claim 1, wherein generating the white balanced output image comprises applying a polynomial kernel function on the initial image to project color channels into a higher-dimensional space.

6. The method of claim 1, wherein the weighting map is learned from images rendered in a standard Red, Green, and Blue color space after a full rendering of demosaiced raw images.

7. The method of claim 1, wherein the weighting map is learned from a linear raw space.

8. The method of claim 1, wherein the deep neural network comprises a GridNet architecture.

9. The method of claim 1, wherein the deep neural network receives a three-dimensional tensor of concatenated white balanced downsampled images and outputs a three-dimensional tensor of the weighting map.

10. A system for white balancing a digital image, the system comprising one or more processors in communication with data storage, using instructions stored on the data storage, the one or more processors are configured to execute:
   an input module to receive the input digital image in an input color space;
   a downsampling module to downsample the input image to generate a downsampled image;
   an image processing module to process the downsampled image with a plurality of preset white balance settings to generate a plurality of downsampled images each with a distinct target white balance, to process the input image at a fixed white balanced setting to produce an initial image, and to input the white balanced downsampled images to a deep neural network to generate a weighting map, the weighting map comprising weights of the preset white balance settings at windows of the downsampled images;
   a mapping module to generate a white balanced output image by determining a sum of the weighting map applied to mapped images each with a target white balance, the mapped images each determined by minimizing a residual sum of squares between the colors of the initial image and the downsampled image with the target white balance; and
   an output module to output the white balanced output image.

11. The system of claim 10, wherein the preset white balance settings and the fixed white balanced setting comprise a color temperature.

12. The system of claim 11, wherein the preset white balance settings comprise a predefined set of color temperatures or tints that each correlate to different lighting conditions.

13. The system of claim 12, wherein generation of the white balanced output image comprises linearly blending the white balanced downsampled images with the weighting map.

14. The system of claim 10, wherein generation of the white balanced output image comprises applying a polynomial kernel function on the initial image to project color channels into a higher-dimensional space.

15. The system of claim 10, wherein the weighting map is learned from images rendered in a standard Red, Green, and Blue color space after a full rendering of demosaiced raw images.

16. The system of claim 10, wherein the weighting map is learned from a linear raw space.

17. The system of claim 10, wherein the deep neural network comprises a GridNet architecture.

18. The system of claim 10, wherein the deep neural network receives a three-dimensional tensor of concatenated white balanced downsampled images and outputs a three-dimensional tensor of the weighting map.

* * * * *